United States Patent [19]

Kumano et al.

[11] Patent Number: 5,783,079

[45] Date of Patent: Jul. 21, 1998

[54] COMPOSITE HOLLOW FIBER MEMBRANE AND PROCESS FOR ITS PRODUCTION

[75] Inventors: Atsuo Kumano; Hiroshi Oguro; Takafumi Hayashi, all of Otsu, Japan

[73] Assignee: Toyo Boseki Kabushiki Kaisha, Osaka-Fu, Japan

[21] Appl. No.: 516,460

[22] Filed: Aug. 17, 1995

[30] Foreign Application Priority Data

| Aug. 29, 1994 | [JP] | Japan | 6-203830 |
| Apr. 12, 1995 | [JP] | Japan | 7-087054 |

[51] Int. Cl.$^6$ .................................. B01D 33/21
[52] U.S. Cl. ............ 210/500.23; 210/490; 210/500.38; 210/500.39; 210/200.41; 427/244; 427/245; 427/246; 264/127
[58] Field of Search ................ 210/490, 500.23, 210/636, 656, 655, 500.38, 500.37, 500.39, 508, 500.78, 500.41; 427/244, 245, 246; 244/127; 428/304.4

[56] References Cited

U.S. PATENT DOCUMENTS

| 3,744,642 | 7/1973 | Scala et al. | 210/500 |
| 4,039,440 | 8/1977 | Cadotte | 210/23 |
| 4,259,183 | 3/1981 | Cadotte | 210/654 |
| 4,277,344 | 7/1981 | Cadotte | 210/654 |
| 4,470,859 | 9/1984 | Behezra et al. | 210/508 |
| 4,888,116 | 12/1989 | Cadotte et al. | 210/636 |
| 4,980,061 | 12/1990 | Tadros et al. | 210/490 |
| 5,308,567 | 5/1994 | Kashida et al. | 264/127 |
| 5,320,754 | 6/1994 | Kohn et al. | 210/490 |
| 5,324,430 | 6/1994 | Chung et al. | 210/490 |
| 5,460,872 | 10/1995 | Wu et al. | 428/304.4 |

OTHER PUBLICATIONS

"Development of Hollow Fiber Reverse Osmosis Membranes", Office of Water Research and Technology Wash., DC, PB81-167215, Nov. 1980, pp. i-iv, 1-32.

Primary Examiner—Ana Fortuna
Attorney, Agent, or Firm—Foley & Lardner

[57] ABSTRACT

A composite hollow fiber membrane is provided, which includes a microporous hollow fiber support membrane and a polymeric ultrathin layer formed on the outer surface of the microporous hollow fiber support membrane by interfacial polymerization, and which contains an organic fluorine compound. Also provided is a process for its production, in which a microporous hollow fiber support membrane is successively contacted with first and second solutions involved in the polymerization, but it is further contacted with a third liquid which is substantially immiscible with the first and/or second solutions and which contains an organic fluorine compound, before and/or after contact with the second solution. Thus, it becomes possible to produce a composite hollow fiber membrane exhibiting excellent permeability and selectivity performance in a continuous and stable manner.

19 Claims, 9 Drawing Sheets

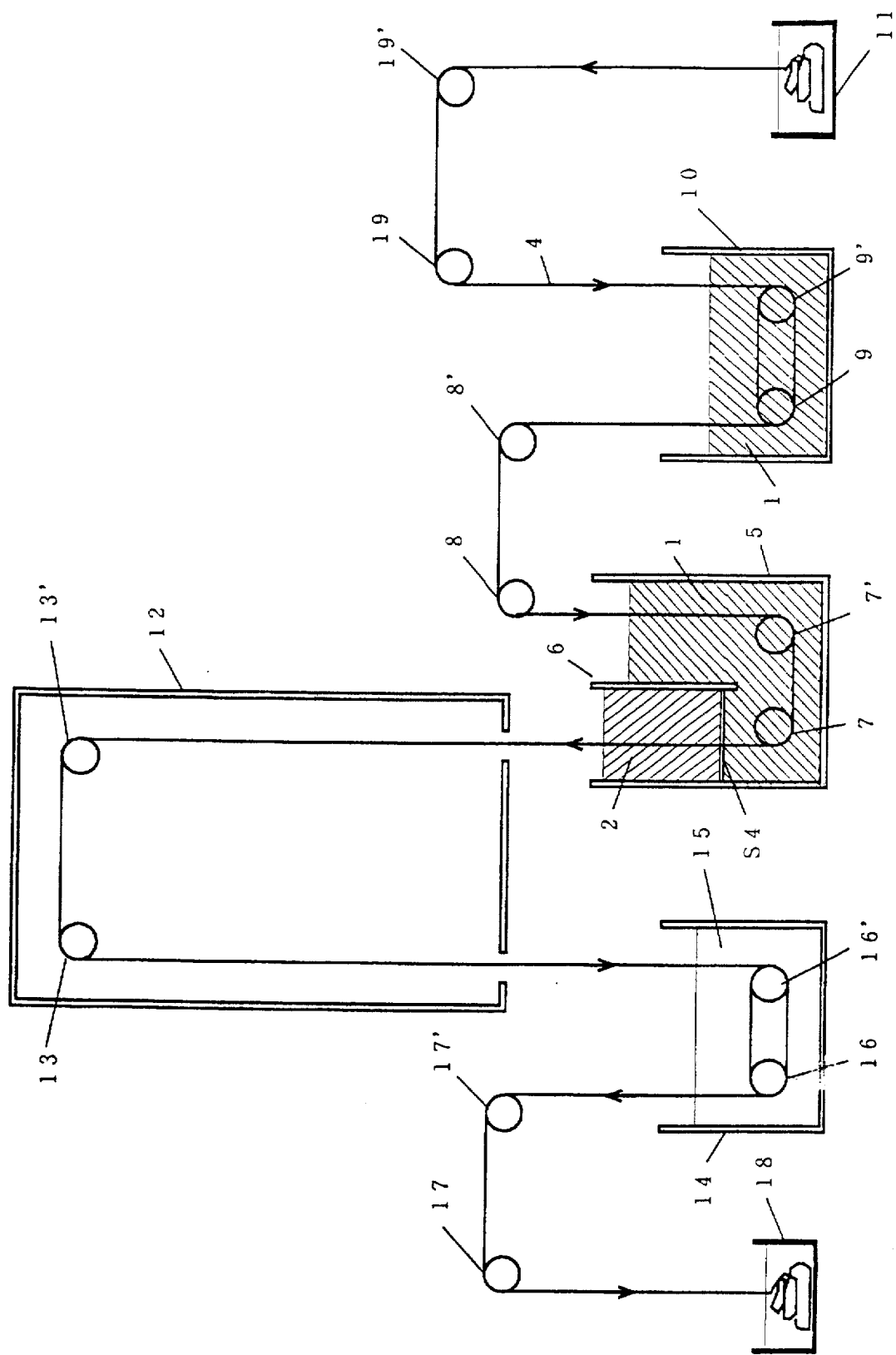

COMPOSITE HOLLOW FIBER MEMBRANE AND PROCESS FOR ITS PRODUCTION

FIELD OF THE INVENTION

The present invention relates to a composite hollow fiber membrane useful as a reverse osmosis membrane or a nano-filtration membrane for selective separation of components in a liquid mixture, and more particularly, it relates to a composite hollow fiber membrane comprising a microporous hollow fiber support membrane and a polymeric ultrathin layer having selective permeability, which is formed on the outer surface of the microporous hollow fiber support membrane. The present invention further relates to a process for producing the composite hollow fiber membrane by forming a polymeric ultrathin layer on the outer surface of a microporous hollow fiber support membrane by interfacial polymerization. The composite follow fiber membrane thus obtained can attain the effective conversion of sea water into fresh water, desalination of salt water, recovery of valuable matter in aqueous solutions, treatment of waste water, and removal of impurities in water.

BACKGROUND OF THE INVENTION

A technique for producing a composite membrane by interfacial polymerization is well known in the art. For example, a microporous support membrane is successively contacted with a first solution containing multifunctional compound A as one polymerizable monomer and then with a second solution which is immiscible with the first solution and which contains multifunctional compound B as the other polymerizable monomer, so that an interfacial polymerization is caused between these multifunctional compounds to form a polymeric ultrathin layer on the microporous support membrane. In the case of flat membranes, many attempts have been made to produce reverse osmosis membranes by this technique as disclosed in U.S. Pat. No. 3,744,642, U.S. Pat. No. 4,039,440, U.S. Pat. No. 4,259,183, U.S. Pat. No. 4,277,344, JP-A 147106/1980, JP-A 133282/1974 and JP-B 38522/1989.

If the above technique is applied to the outer surface of a microporous hollow fiber support membrane without any modification, the microporous hollow fiber support membrane inevitably gets in touch with rollers or other feeding means during and/or just after the formation of a polymeric ultrathin layer on the outer surface of the microporous hollow fiber support membrane, which causes the peeling or damage of the polymeric ultrathin layer responsible for the occurrence of membrane defects. For this reason, it is impossible to produce a composite hollow fiber membrane of high performance having a uniform ultrathin layer without any membrane defect in a stable and continuous manner.

In the case of composite hollow fiber membranes, an improved technique for solving the above problem is disclosed in U.S. Pat. No. 4,980,061, JP-A 95105/1987 and JP-A 87807/1985, i.e., a technique for forming a polymeric ultrathin layer on the outer surface of a microporous hollow fiber support membrane by passing it though the liquid-liquid interface formed between the first and second solutions. Further, PB Report 81-167215 discloses a composite hollow fiber membrane obtained by successively immersing and passing a microporous hollow fiber support membrane through a bath containing an aqueous piperazine solution and then through a bath containing a solution of an acid chloride in cyclohexane, as well as a process for its production. JP-2842/1990 discloses a composite hollow fiber membrane having a cross-linked polyamide ultrathin layer formed on the surface of a microporous hollow fiber support membrane. As a process for its production, in the case where the ultrathin layer is formed on the outer surface of a microporous hollow fiber support membrane, the microporous hollow fiber support membrane is impregnated with a multifunctional amine solution, air-dried, and then immersed in a multifunctional acid chloride solution. JP-A 114246/1994 discloses a production process in which a bath provided with a sluice or an opening for the entrance and exit of a microporous hollow fiber support membrane is used as a bath for its immersion in the second solution.

In the conventional process for producing a composite hollow fiber membrane by interfacial polymerization (U.S. Pat. No. 4,980,061, JP-A 95105/1987 and JP-A 87807/1985), the above technique for forming a polymeric ultrathin layer on the outer surface of a microporous hollow fiber support membrane by passing it through the liquid-liquid interface formed between the first and second solutions makes it possible to feed the composite hollow fiber membrane to the subsequent step such as drying or heat treatment for the fixation of the polymeric ultrathin layer to the microporous hollow fiber support membrane in such a manner that the polymeric ultrathin layer formed on the outer surface of the microporous hollow fiber support membrane is kept out of touch with rollers or other feeding means during and/or just after its formation. However, because a polymeric film formed in planar shape at the liquid-liquid interface between the first and second solutions is simply disposed on the curved surface of the microporous hollow fiber support membrane, an ultrathin layer cannot be uniformly formed on the outer surface of the microporous hollow fiber support membrane and the polymeric ultrathin layer has a decreased adhesion to the microporous hollow fiber support membrane. Further, a step of removing or drying an excess of the first solution adhering to the microporous hollow fiber support membrane cannot be introduced after immersion in the first solution. A part of the polymeric ultrathin layer, which is formed at the liquid-liquid interface between the above two solutions but is not disposed on the outer surface of the microporous hollow fiber support membrane, has an increased thickness with the lapse of time, and this part of the polymeric ultrathin layer may often inhibit the formation of a polymeric ultrathin layer on the outer surface of the microporous hollow fiber support membrane. It is, therefore, difficult to form a uniform ultrathin layer on the outer surface of a microporous hollow fiber support membrane in a continuous manner. Under the existing circumstances, these problems prevent the production of a composite hollow fiber membrane exhibiting high permeability and selectivity performance.

The production process disclosed in PB Report 81-167215, in which a microporous hollow fiber support membrane is successively immersed and passed through two solution baths, has the following disadvantage. Although this process is not definitely shown by a drawing, it is supposed that an ultrathin layer is damaged by rollers or other feeding means during and/or just after its formation similarly to the case of flat membranes described above. In fact, there was found large scattering of performance data on the composite hollow fiber membranes obtained by this process, and in particular, they exhibited low selectivity performance.

The production process disclosed in JP-2842/1990, in which a microporous hollow fiber support membrane is successively immersed in a multifunctional amine solution and then in a multifunctional acid halide solution, has a similar disadvantage. Although this process is neither definitely shown by a drawing nor fully understood, an air-drying step is simply inserted between the successive immersion steps, and there is substantially no difference between this process and the case of flat membranes described above. In fact, only a composite hollow fiber membrane of low performance was obtained. This seems because the same problem as above may possibly arise when this process is applied to a continuous microporous hollow fiber support membrane.

The present invention, which is to solve these problems in the prior art, has an object of providing a composite hollow fiber membrane exhibiting high permeability and selectivity performance obtained by forming a uniform polymeric ultrathin layer on the outer surface of a microporous hollow fiber support membrane in a continuous and stable manner, as well as a process for its production.

SUMMARY OF THE INVENTION

Under these circumstances, the present inventors have intensively studied to obtain a composite hollow fiber membrane of high performance. As a result, they have found that a composite hollow fiber membrane of high performance can be obtained by allowing the composite hollow fiber membrane to contain an organic fluorine compound, thereby achieving the above object.

Further, they have found the following two processes for forming a uniform polymeric ultrathin layer, with the incorporation of an organic fluorine compound, on the outer surface of a microporous hollow fiber support membrane in a continuous and stable manner, thereby completing the present invention.

That is, one is a process in which a microporous hollow fiber support membrane is successively contacted substantially vertically with a first solution, with a second solution, and then with a third liquid which is substantially immiscible with the second solution so that a liquid-liquid interface can be formed therebetween and which contains an organic fluorine compound; and the other is a process in which a microporous hollow fiber support membrane is successively contacted with a first solution, with a third liquid which is substantially immiscible with the first solution so that a liquid-liquid interface can be formed therebetween and which contains an organic fluorine compound, and then with a second solution which is substantially immiscible with the third solution so that a liquid-liquid-interface can be formed therebetween. With the use of these novel processes, it becomes possible to incorporate an organic fluorine compound into the composite hollow fiber membrane, to cause interfacial polymerization only on the outer surface of a microporous hollow fiber support membrane, and to feed the composite hollow fiber membrane to the subsequent step such as drying, heat treatment, or if necessary, alkali treatment, for the fixation of the polymeric ultrathin layer to the microporous hollow fiber support membrane in such a manner that the polymeric ultrathin layer formed on the outer surface of the microporous hollow fiber support membrane is kept out of touch with rollers or other feeding means during and/or just after its formation.

Further, they have found that when a third liquid is used for scraping off an excess of the first solution adhering to the outer surface of a microporous hollow fiber support membrane, the microporous hollow fiber support membrane can be successively contacted with a second solution for causing interfacial polymerization, while controlling the film thickness of the first solution on the microporous hollow fiber support membrane, which results in a composite hollow fiber membrane exhibiting excellent permeability and selectivity performance, thereby completing the present invention.

It should be noted that these processes are completely different in the technical idea from the conventional processes in which a polymeric ultrathin layer formed at the liquid-liquid interface between the first and second solutions is simply disposed on the outer surface of a microporous hollow fiber support membrane or in which a microporous hollow fiber support membrane is successively passed through a first solution bath and then through a second solution bath.

Thus, the present invention provides a composite hollow fiber membrane comprising a microporous hollow fiber support membrane and a polymeric ultrathin layer formed on the outer surface of the microporous hollow fiber support membrane, which composite hollow fiber membrane contains an organic fluorine compound.

The present invention further provides two different processes for producing the composite hollow fiber membrane described above.

The first process (hereinafter referred to as production process I) comprises the steps of: (a) contacting a microporous hollow fiber support membrane with a first solution containing multifunctional compound A; (b) contacting the microporous hollow fiber support membrane treated in step (a) with a second solution which is substantially immiscible with the first solution and which contains multifunctional compound B, thereby causing interfacial polymerization between the multifunctional compounds A and B to form a polymeric ultrathin layer on the outer surface of the microporous hollow fiber support membrane; and (c) contacting the microporous hollow fiber support membrane treated in step (b) with a third liquid which is substantially immiscible with the second solution and which contains an organic fluorine compound.

The second process (hereinafter referred to as production process II) comprises the steps of: (a) contacting a microporous hollow fiber support membrane with a first solution containing multifunctional compound A; (b) contacting the microporous hollow fiber support membrane treated in step (a) with a third liquid which is substantially immiscible with the first solution and which contains an organic fluorine compound; and (c) contacting the microporous hollow fiber support membrane treated in step (b) with a second solution which is substantially immiscible with the first solution and the third liquid and which contains multifunctional compound B, thereby causing interfacial polymerization between the multifunctional compounds A and B to form a polymeric ultrathin layer on the outer surface of the microporous hollow fiber support membrane.

BRIEF DESCRIPTION OF THE DRAWINGS

FIG. 9 is a schematic flow diagram showing the conventional production of a composite hollow fiber membrane, wherein a liquid-liquid interface is formed between the first and second solutions.

DETAILED DESCRIPTION OF THE INVENTION

Figure 1:
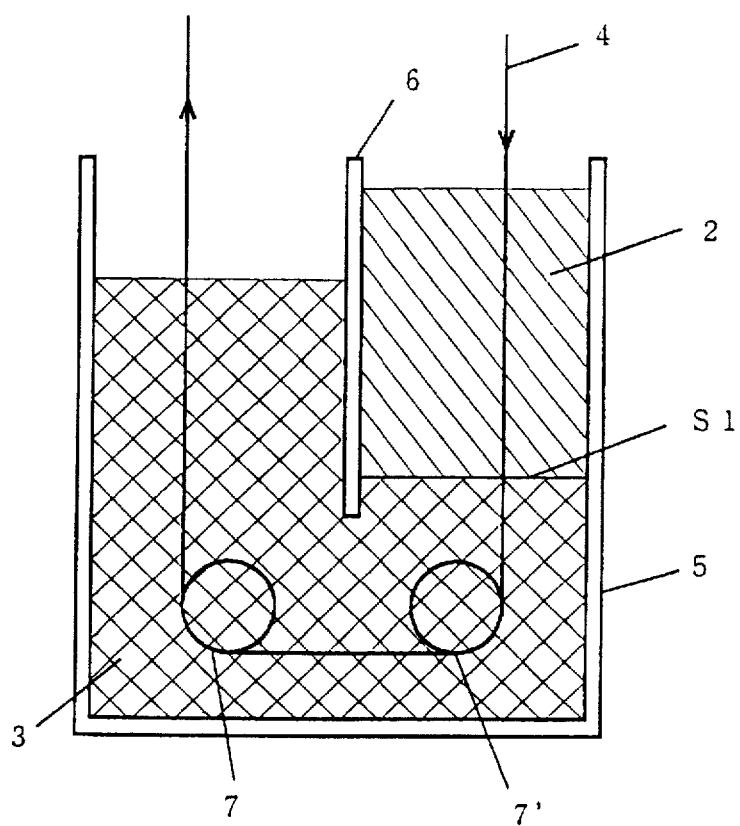
FIG. 1 is a schematic view showing a model of the method for successively contacting a microporous hollow fiber support membrane with a second solution and then with a third liquid in the production process I of the present invention, wherein the specific gravity of the third liquid is greater than that of the second solution and a liquid-liquid interface is formed between the second solution and the third liquid.

The composite hollow fiber membrane of the present invention is composed of a microporous hollow fiber support membrane as a support membrane and a polymeric ultrathin layer formed on the outer surface of the support membrane. The microporous hollow fiber support membrane may exhibit substantially no selectivity performance to the matter to be separated, and it may only serve as a support membrane for the polymeric ultrathin layer. The microporous hollow fiber support membrane is not particularly limited, and it can be any one of the conventional microporous hollow fiber support membranes known in the art.

The outer surface of a microporous hollow fiber support membrane is preferably provided with micropores having a size of 0.1 μm or less, more preferably 0.05 μm or less. The inner surface of the microporous hollow fiber support membrane is preferably provided with micropores having a larger size than that of the micropores on the outer surface so that the permeation resistance of a fluid is not increased than required. These micropores may have a net-shaped or finger-shaped structure, or a mixture thereof. As an example of the permeability performance of a support membrane, the water permeability per unit pressure and unit area is typically 0.01 to 0.2 $m^3/(m^2.day.(kg/cm^2))$, preferably 0.02 to 0.1 $m^3/(m^2.day.(kg/cm^2))$, for high-pressure reverse osmosis membranes which can be used for the conversion of sea water into fresh water; typically 0.2 to 10 $m^3/(m^2.day.(kg/cm^2))$, preferably 0.5 to 5 $m^3/(m^2.day.(kg/cm^2))$, for low-pressure reverse osmosis membranes which are used under a pressure of 15 $kg/cm^2$ or lower; and typically 0.5 to 50 $m^3/(m^2.day.(kg/cm^2))$, preferably 1 to 20 $m^3/(m^2.day.(kg/cm^2))$, for nano-filtration membranes which are used under a lower pressure. If the water permeability of a support membrane is too small, the permeability performance of a composite hollow fiber membrane obtained will also be deteriorated. To the contrary, if the water permeability is too large, the strength of a support membrane will become small, and there is a possibility that the support membrane may be broken under a certain operating pressure. As another example of the permeability performance of a support membrane, the dextran (average molecular weight, 185,000) rejection is preferably at least 50%.

The microporous hollow fiber support membrane may be made of any material, so long as the material can be formed into a microporous hollow fiber support membrane; however, it should not be damaged on the membrane structure by dissolution or decomposition when contacted with the first solution, second solution or third liquid. For example, when the first solution, second solution and third liquid are an aqueous solution of an amine and an acid acceptor, a solution of an acid chloride in hexane, and a fluorocarbon inert liquid, respectively, it is preferred that the microporous hollow fiber support membrane is composed mainly of at least one polymer selected from the group consisting of polysulfones, polyethersulfones, polyacrylonitriles, polyethylenes, polypropylenes and polyamides, more preferably selected from the group consisting of polysulfones and polyethersulfones.

The size of a microporous hollow fiber support membrane is not particularly limited; however, in view of workability in the membrane formation, membrane area of a module, and pressure resistance, the microporous hollow fiber support membrane preferably has an outer diameter of 100 to 2000 μm, more preferably 150 to 500 μm, and an inner diameter of 30 to 1800 μm, more preferably 50 to 300 μm. Further, the microporous hollow fiber support membrane should at least resist pressure greater than the operating pressure applied as a composite membrane. The microporous hollow fiber support membrane can be selected from various commercial sources or can be produced by any known method for dry-wet membrane formation or melt membrane formation. If necessary, the microporous hollow fiber support membrane after its formation may be treated with wet heat at 50° C. as disclosed in JP-A 199007/1983 or may be treated with hot water at 90° C. or higher as disclosed in JP-A 190204/1985. Further, if necessary, the microporous hollow fiber support membrane may be impregnated, before use, with a clogging agent to prevent excess penetration of the first solution.

The polymeric ultrathin layer substantially exhibiting selectivity performance is formed on the outer surface of a microporous hollow fiber support membrane by interfacial polymerization. In the case of reverse osmosis membranes, for example, the polymeric ultrathin layer may be made of a polyamide, preferably cross-linked polyamide, obtained by interfacial polycondensation of a multifunctional amine and a multifunctional acid halide, or of a polyurea obtained by interfacial polymerization of a polyamine and a multifunctional isocyanate. Preferably, the polymeric film has a thickness as small as possible, so long as it contains no pin holes. In view of stability in the membrane formation and permeability performance, the thickness of the polymeric ultrathin layer is preferably 0.5 µm or less, more preferably 0.2 µm or less. If necessary, a protective layer may be formed on the surface of the polymeric ultrathin layer.

The organic fluorine compound contained in the composite hollow fiber membrane of the present invention is preferably selected from the group consisting of perfluorocarbon compounds and perfluoroalkyl-containing compounds. The incorporation of an organic fluorine compound into the composite hollow fiber membrane might lead to the formation of a uniform polymeric ultrathin layer and attain high permeability and selectivity performance; however, its mechanism has not yet been elucidated. In general, these organic fluorine compounds are characterized in that they have low dielectric constant, low surface tension and low refractive index, and it is supposed that a polymeric ultrathin layer can be produced in a uniformly dispersed state by the presence of an organic fluorine compound during and/or just after its formation, which makes it possible to form a uniform polymeric ultrathin layer without any defect in a continuous and stable manner.

The organic fluorine compound may be present anyplace in the composite hollow fiber membrane, for example, on the surface or inside of the polymeric ultrathin layer, at the interface between the polymeric ultrathin layer and the microporous hollow fiber support membrane, or in the microporous hollow fiber support membrane. It should be noted that the organic fluorine compound is not present by chemically bonding to the polymeric ultrathin layer or microporous hollow fiber support membrane. Even if the organic fluorine compound is contained at very small amounts, satisfactory effects as described above can be sufficiently attained. However, if the fluorine compound is contained at too large amounts, the permeability performance will be much affected and deteriorated by the hydrophobicity of the organic fluorine compound. The amount of the organic fluorine compound to be contained is preferably 1 to 1000 ppm in terms of fluorine (F) content per weight of the composite hollow fiber membrane in dry state.

The following will describe the process for producing a composite hollow fiber membrane according to the present invention.

The kinds and combinations of multifunctional compounds A and B, as well as the kinds of solvents used in the first and second solutions, which can be employed in the production processes of the present invention, are not particularly limited, so long as the multifunctional compounds A and B can cause interfacial polymerization to form a polymer.

When the polymeric ultrathin layer is made of a polyamide, the multifunctional compound A can be selected from various amines, for example, aromatic or aliphatic amines, and the multifunctional compound B can be selected from various acid halides, for example, aromatic or aliphatic acid halides, so long as these compounds A and B can be reacted together to form the polyamide.

The aromatic amines may be those having at least bifunctionality, i.e., those having at least two amino groups in one molecule. Examples of such an aromatic amine include m-phenylenediamine, p-phenylenediamine, 4,4-diaminodiphenylamine, 4,4'-diaminodiphenyl ether, 3,4'-diaminodiphenyl ether, 3,3'-diaminodiphenylamine, 3,5-diaminobenzoates, 4,4'-diaminodiphenylsulfone, 3,3'-diaminodiphenylsulfone, 3,4'-diaminodiphenylsulfone, 1,3,5-triaminobenzene, and mixtures thereof. Most preferred is m-phenylenediamine.

The aliphatic amines may be those having at least bifunctionality, i.e., those having at least two amino groups in one molecule. Examples of such an aliphatic amine include piperazine derivatives such as piperazine, 2-methylpiperazine, 2-ethylpiperazine, 2,5-dimethylpiperazine, homopiperazine and t-2,5-dimethylpiperazine; bis(4-piperidyl)methane, 1,2-bis(4-piperidyl)ethane, 1,3-bis(4-piperidyl)propane, N,N'-dimethylethylenediamine, ethylenediamine, propylenediamine, propylenetriamine, N,N'-dimethylpropanediamine, 4-(aminomethyl)piperidine, cyclohexanediamine, and mixtures thereof. The aliphatic amines may be amide prepolymers constituted from these amine compounds.

The acid halides may be those having at least bifunctionality. Preferred are aromatic or alicyclic bi- or trifunctional acid halides, example of which are trimesoyl halide, trimellitoyl halide, pyromellitoyl halide, benzophenonetetracarbonyl halide, isophthaloyl halide, terephthaloyl halide, diphenyldicarbonyl halide, naphthalenedicarbonyl halide, benzenesulfonyl halide, chlorosulfonylisophthaloyl halide, pyridinecarbonyl halide, and 1,3,5-cyclohexanetricarbonyl halide. In view of performance as a reverse osmosis membrane, trimesoyl chloride, isophthaloyl chloride, terephthaloyl chloride, and mixtures thereof are preferred.

Each of the multifunctional compounds A and B is not limited to a single compound, and depending upon the purpose, a plurality of homologous multifunctional compounds capable of causing the same reaction can be used together. In usual cases, three kinds or less of multifunctional compounds are often used.

The concentrations of these multifunctional compounds may vary depending upon their kinds and distribution coefficients to solvents. For example, when an aqueous piperazine solution is used as the first solution and a solution of trimesoyl chloride in n-hexane is used as the second solution, the concentration of piperazine is appropriately about 0.1% to 10% by weight, preferably about 0.5% to 5% by weight, and the concentration of trimesoyl chloride is appropriately about 0.01% to 10% by weight, preferably about 0.1% to 5% by weight. If these concentrations are under the respective lower limits, the formation of a polymeric ultrathin layer by interfacial polymerization will become imperfect, so that defects are liable to occur in the polymeric ultrathin layer, which may cause a deterioration of the selectivity performance. If these concentrations are over the respective upper limit, the thickness of a polymeric ultrathin layer becomes too large, which may cause a deterioration of the permeability performance, or the amount of unreacted matter remaining in the polymeric ultrathin layer during the membrane formation is increased, which may affect an adverse influence on the membrane performance.

When an acid is formed in the polycondensation reaction, an alkali as an acid acceptor may be added to an aqueous solution, or a surface active agent may be added to an aqueous solution, for the purpose of improving the wettability to the microporous hollow fiber support membrane. In addition, reaction accelerators for the respective multifunctional compounds may be added, if necessary. Examples of the acid acceptor include caustic alkalis such as sodium hydroxide, sodium phosphates such as trisodium phosphate, pyridine, triethylenediamine, triethylamine, and sodium tertiary amine acetate. Examples of the surface active agent include sodium laurylsulfonate and sodium laurylbenzenesulfonate. Examples of the reaction accelerator include dimethylformamide (DMF). These additives can be added in advance to the first and/or second solutions.

In the present invention, the term "first solution" refers to a liquid containing multifunctional compound A, which is first contacted with a microporous hollow fiber support membrane, and the term "second solution" refers to a liquid containing multifunctional compound B, which is later contacted with the microporous hollow fiber support membrane for causing interfacial polymerization. As used herein, the term "liquid" means a solution obtained by dissolving a multifunctional compound in a solvent; however, if the multifunctional compound is a liquid monomer, the solution may be the multifunctional compound itself. As to the solvent used herein, a mixture of solvents may be used to control the solubility of a multifunctional compound, specific gravity of the solution, and formation of a liquid-liquid interface.

The solvents used in the first and second solutions are not particularly limited, so long as they can dissolve the multifunctional compounds A and B, respectively, to form a liquid-liquid interface when these solutions are contacted with each other, and inflict no damage to the microporous hollow fiber support membrane. For example, when the multifunctional compound A is a multifunctional amine and the multifunctional compound B is a multifunctional acid halide, the solvent in the first solution include water and the solvent in the second solution include hydrocarbon solvents such as n-hexane, cyclohexane, n-heptane, n-octane, n-nonane, n-decane and n-undecane.

In the case of production process I, the third liquid is not particularly limited, so long as it is substantially immiscible with the second solution; however, from the viewpoint of easy construction of an apparatus, it is preferred that the specific gravity of the third liquid is greater than that of the second solution. It is also preferred that the third liquid is substantially immiscible both with the first and second solutions. In the case of production process II, the third liquid is not particularly limited, so long as it is substantially immiscible both with the first and second solutions. Such a third liquid should be selected depending upon the combination of the first and second solutions. Further, the third liquid may be a mixture of liquids to control its flowability, solidifying point and specific gravity. As used herein, the term "substantially immiscible" means that two liquids are completely immiscible or they are slightly miscible but cause phase separation, even if mixed together, to form a liquid-liquid interface therebetween. The solubility between the liquids is preferred to be as small as possible, and the solubility at ordinary temperatures (from 15° to 25° C.) is preferably 10% by weight or less, more preferably 5% by weight or less. If the third liquid is substantially immiscible both with the first and second solutions, this fact means that the third liquid is also substantially immiscible with the respective solvents in the first and second solutions, as well as that the third liquid is also substantially immiscible with the multifunctional compounds A and B dissolved in the first and second solutions, respectively, and there occurs no reaction therebetween.

Typical examples of the third liquid when the first and second solutions are an aqueous piperazine solution and a solution of trimesoyl chloride in n-hexane, respectively, include fluorocarbon inert liquids, particularly perfluorocarbon compounds and perfluoroalkyl-containing compounds. These compounds are not particularly limited, so long as they have the above properties, even if they are amines, ethers, unsaturated compounds, aromatic compounds or aliphatic compounds. Preferred examples include perfluoroalkyl-containing tertiary amines of the formula:

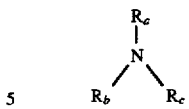

wherein $R_a$, $R_b$ and $R_c$ are independently $C_4$–$C_6$ perfluoroalkyl, and the total number of carbon atoms is 14 to 16.

A specific example of the perfluoroalkyl-containing tertiary amine is Fluorinert FC-70 (commercially available from Sumitomo 3M). This fluorocarbon inert liquid is composed mainly of a tertiary amine, $C_nF_{2n+3}N$ ($n=15$). The solubilities among the fluorocarbon inert liquid FC-70, water as a solvent in the first solution, and n-hexane as a solvent in the second solution are as follows: the solubility of water in n-hexane is 0.014% by weight (15.5° C., from "Yozai Handbook" (Kodan-sha)), the solubility of water in the fluorocarbon inert liquid FC-70 is 0.0008% by weight (25° C., from the Fluorinert catalog), and the solubility of n-hexane in the fluorocarbon inert liquid FC-70 is 1% to 5% by weight (25° C., from the Fluorinert catalog; about 3% (23° C.) as measured by the present inventors). It is also noted that piperazine or trimesoyl chloride has almost no solubility in the fluorocarbon inert liquid FC-70. Besides this inert liquid, Fluorinert FC-71 (also commercially available from Sumitomo 3M) can also be preferably used. When cyclohexane is used as a solvent of the second solution, Fluorinert FC-84, FC-77, FC-75, FC-40 and FC-43 (also commercially available from Sumitomo 3M) can be used, in addition to FC-70 and FC-71.

The temperatures of the first and second solutions and the third liquid are not particularly limited, so long as a combination of multifunctional compounds capable of rapidly causing interfacial reaction at room temperature is employed, but they are usually around room temperature, i.e., in the range of 5° to 35° C., from the viewpoint of operability. If these temperatures are over the upper limit, the deterioration of multifunctional compounds or the evaporation of solvents will be enhanced. If these temperatures are under the lower limit, the impregnation of a microporous hollow fiber support membrane with the first solution will be insufficient, too much slow rate of the interfacial reaction will give incomplete formation of a polymeric ultrathin layer, or too much large viscosity of solvents will have an adverse effect on the film formation step.

As used herein, contacting a microporous hollow fiber support membrane with each of the first and second solutions or the third liquid means immersing and passing the microporous hollow fiber support membrane through each solution or liquid. When the microporous hollow fiber support membrane is passed through the liquid surface of the first or second solution or the liquid-liquid interface between these solutions and the third liquid, it is preferred that the microporous hollow fiber support membrane is run substantially vertically to the liquid surface or liquid-liquid interface to form a uniform ultrathin layer.

After immersion in the first solution, an excess of the first solution remaining on the outer surface of a microporous hollow fiber support membrane will be responsible for the peeling of a polymeric ultrathin layer. It is, therefore, preferred to remove an excess of the first solution. For example, an excess of the first solution can be removed by running the microporous hollow fiber support membrane in air for free fall and spontaneous drying, by scraping it off with the third liquid, by blowing air or an inert gas upon it, or by drying it with a dryer.

After passing through the third liquid, the microporous hollow fiber support membrane may be immersed in an aqueous solution of an acid acceptor for neutralization and termination of the reaction. Examples of the acid acceptor include sodium phosphates such as trisodium phosphate, and sodium carbonate.

The following will describe a model of the part in which a microporous hollow fiber support membrane is contacted with each solution or liquid in the production process I of the present invention. FIG. 1 shows an example of the case where the specific gravity of the third liquid 3 is greater than that of the second solution 2 in the steps (b) and (c) for successively contacting the microporous hollow fiber support membrane 4 with the second solution 2 and then with the third liquid 3. In this case, the third liquid 3 is put into the solution bath 5, and the second solution 2 is put into one of the upper parts divided by the partition 6 so as not to overflow the partition 6. After immersion in the first solution (not shown), the microporous hollow fiber support membrane 4 is introduced substantially vertically from above into the second solution 2, in which a polymeric ultrathin layer is formed on the outer surface of the microporous hollow fiber support membrane 4 by interfacial polymerization. Then, the microporous hollow fiber support membrane 4 is passed through the liquid-liquid interface S1 between the second solution 2 and the third liquid 3, and introduced into the third liquid 3. The third liquid 3 is not involved in the interfacial polymerization; however, if the reaction between the multifunctional compounds A and B remaining on the outer surface of the microporous hollow fiber support membrane 4 just after contact with the third liquid 3 has continued, a part of the third liquid 3 is incorporated into the membrane. The microporous hollow fiber support membrane 4 is turned around the driving rollers 7' and 7 to go under the partition 6, and taken out substantially vertically from the third liquid 3, followed by prompt feeding to the subsequent step such as drying. In this process, by the use of the third liquid 3, the microporous hollow fiber support membrane 4 can be passed though the second solution 2 out of touch with driving rollers or other feeding means.

When a volatile organic solution is used in the second solution, it is preferred that the surface area of the upper part open to the atmosphere is made as small as possible. This is to prevent the evaporation of the solvent as effectively as possible so that the change in the concentration of the multifunctional compound B is reduced to attain not only the stable production of a composite hollow fiber membrane but also the maintenance of clean working atmosphere. To reduce the surface area of the upper part open to the atmosphere, a capillary may be used to pass the microporous hollow fiber support membrane therethrough.

As a matter of course, FIG. 1 shows the case of only one microporous hollow fiber support membrane, but it is needless to say that two or more microporous hollow fiber support membranes can readily be treated at a time, in which case the width of the solution bath 5 is appropriately determined.

As described above, if necessary, the microporous hollow fiber support membrane may be subjected to pre-treatments such as drying, treatment for making it hydrophilic, and impregnation with a clogging agent. Further, if necessary, the microporous hollow fiber support membrane may be fed to an apparatus for drying or heat treatment to ensure the termination of the interfacial reaction between the remaining unreacted multifunctional compounds, removal of the remaining solvent, and adhesion of the polymeric ultrathin layer to the outer surface of the microporous hollow fiber support membrane. The conditions for drying or heat treatment may vary depending upon the material of the microporous hollow fiber support membrane, material of the polymeric ultrathin layer, and kinds of the solutions and liquid; for example, in the case where the microporous hollow fiber support membrane is made of a polysulfone, the polymeric ultrathin layer is made of a polyamide, the first solution is an aqueous solution of a multifunctional amine, and the second solution is a solution of a multifunctional acid chloride in n-hexane, the drying or heat treatment is preferably conducted at a temperature of 20° to 100° C. for a period of 10 seconds to 20 minutes. Moreover, there may be provided, if necessary, a step of forming a layer of a protective agent on the surface of the polymeric ultrathin layer formed. If necessary, there may be conducted washing or other treatments for the removal of the remaining unreacted multifunctional compounds and removal or neutralization of the reaction by-products. The composite hollow fiber membrane after the formation of the polymeric ultrathin layer may be subjected to drying treatment, if necessary. The method for its storage is not particularly limited, and either dry storage or wet storage can be employed.

According to the production processes of the present invention, a composite hollow fiber membrane suitable for the desired purpose can be obtained by establishing the optimum conditions as to the concentrations and temperatures of the solutions and liquid, running rate of a microporous hollow fiber support membrane, depths of the layers of the solutions and liquid, and running distance or residence time of a microporous hollow fiber support membrane. For example, the running rate of a microporous hollow fiber support membrane can be 0.5 to 20 m/min. at which rate the composite hollow fiber membrane can be produced in a continuous manner. In the long-term continuous production, the multifunctional compounds are gradually consumed with a progress of the interfacial reaction, and the concentrations of the solutions containing them are changed. For this reason, there may be provided a step of renewing the solutions in the respective baths to control their concentrations, if necessary.

Figure 2:
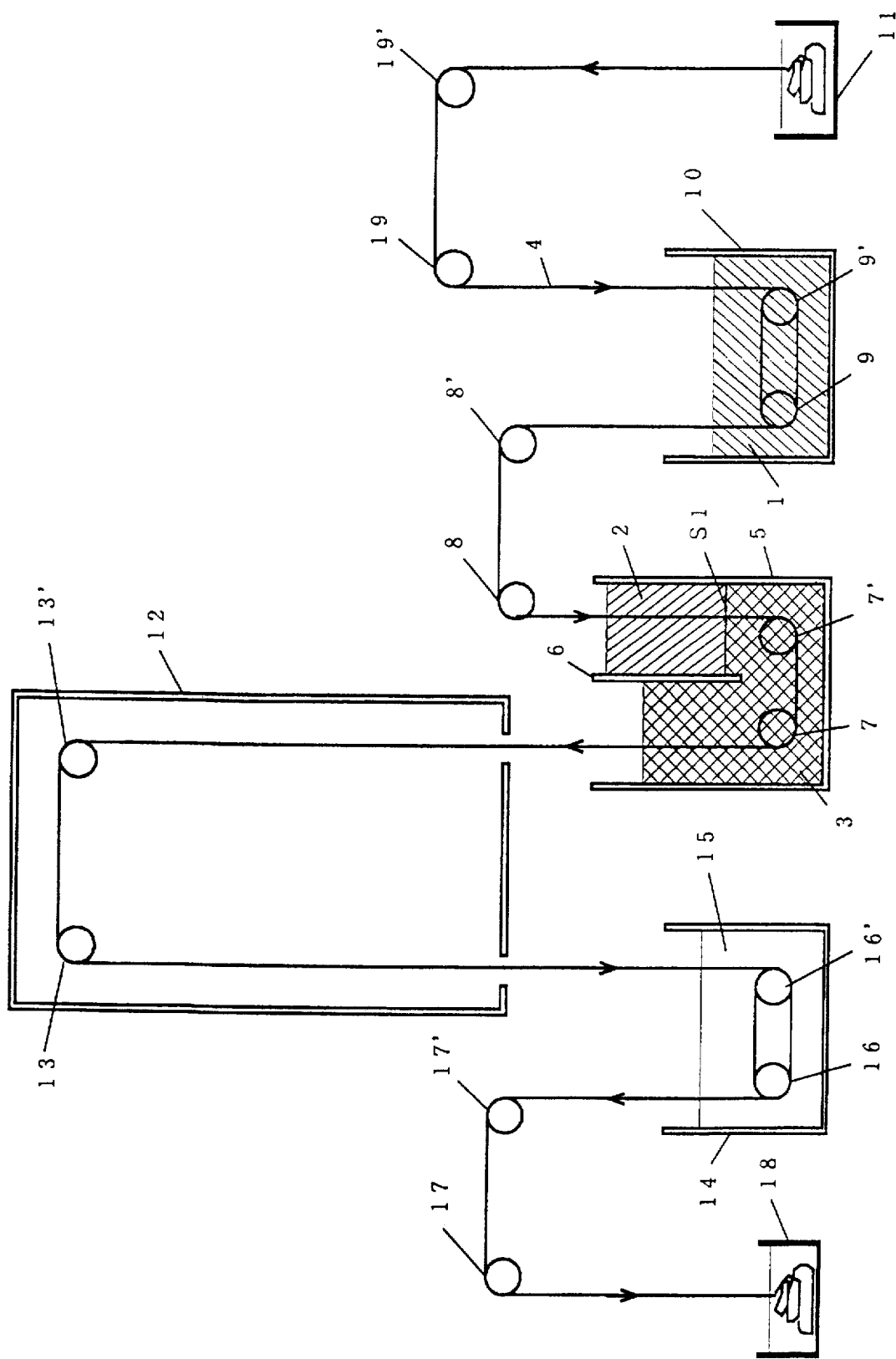
FIG. 2 is a schematic flow diagram showing the production of a composite hollow fiber membrane using the contact model of FIG. 1.

FIG. 2 shows a schematic flow diagram showing an example of the production of a composite hollow fiber membrane by the production process I of the present invention. The outlines of this process are explained below.

From the supply bath 11, the microporous hollow fiber support membrane 4 in wet state is taken out by the driving rollers 19' and 19, which is then introduced and immersed in the first solution bath 10 to go through the first solution 1 by way of the driving rollers 9' and 9. Then, the microporous hollow fiber support membrane 4 having the first solution 1 adhering thereto and impregnated with the first solution 1 is taken out substantially vertically from the first solution bath 10 by the driving rollers 8' and 8. During the running in air, an excess of the first solution 1 is removed. The amount of the first solution 1 adhering to the microporous hollow fiber support membrane 4 can be controlled by adjusting the distance of this running in air. Then, the microporous hollow fiber support membrane 4 is introduced substantially vertically into the second solution bath 5 to go through the second solution 2 out of touch with driving rollers or other feeding means, thereby causing interfacial polymerization on the outer surface of the microporous hollow fiber support membrane 4. After passing through the liquid-liquid interface S1 between the second solution 2 and the third liquid 3, the microporous hollow fiber support membrane 4 having a polymeric ultrathin layer that is being formed on the outer surface thereof by the interfacial polymerization is immersed into the third liquid 3, taken out substantially vertically from the third liquid 3 by way of the driving rollers 7' and 7, and introduced into the drying chamber 12 to fix the polymeric ultrathin layer on the outer surface of the microporous hollow fiber support membrane 4. The composite hollow fiber membrane thus obtained is immersed into the water washing bath 14 by way of the driving rollers 13' and 13 to go though the washing water 15 by way of the driving rollers 16' and 16, and introduced into the receiving bath 18 by way of the driving rollers 17' and 17.

Figure 3:
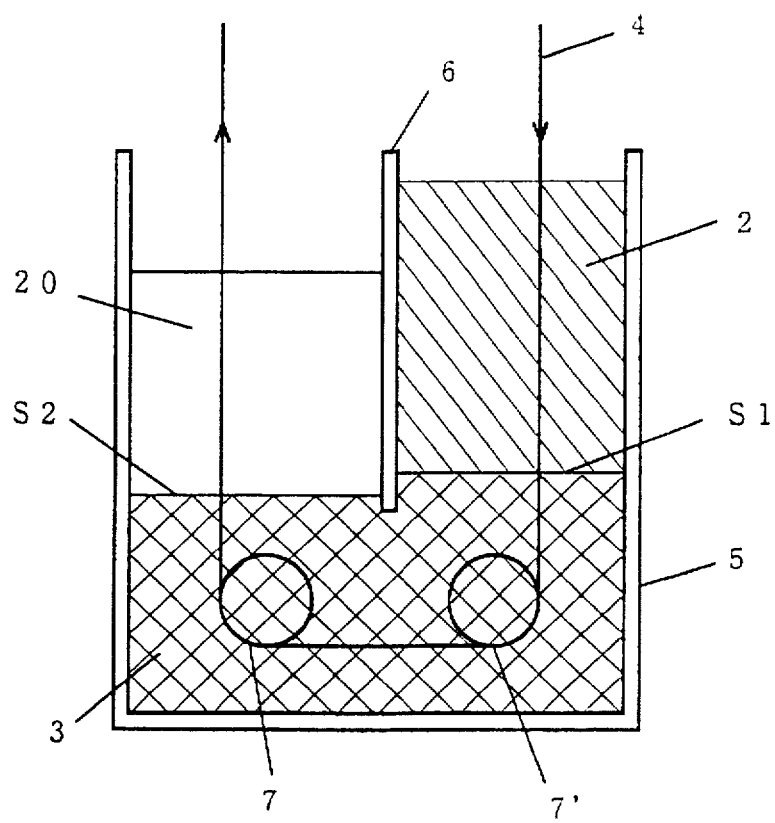
FIG. 3 is a schematic view showing another contact model similar to that of FIG. 1, except that a microporous hollow fiber support membrane is immersed in an aqueous solution of an acid acceptor after its passing through the third liquid.

FIG. 3 shows an example of the case where a microporous hollow fiber support membrane after passing through the third solution is immersed into an aqueous solution of an acid acceptor for the neutralization of reaction products from the interfacial polymerization and for the terminal treatment of unreacted groups. When the solvent of the first solution is water, and the third liquid is substantially immiscible both with the first and second solutions to form a liquid-liquid interface therebetween, a liquid-liquid interface is also formed between the third liquid and the aqueous solution of an acid acceptor. If the specific gravity of the third liquid is greater than that of the second solution and that of the aqueous solution of an acid acceptor, the third liquid 3 is put into the solution bath 5, and the second solution 2 and the aqueous solution of an acid acceptor 20 are separately put into the respective upper parts divided by the partition 6 so as not to overflow the partition 6. After immersion in the first solution (not shown), the microporous hollow fiber support membrane 4 is introduced substantially vertically from above into the second solution 2, in which a polymeric ultrathin layer is formed on the outer surface of the microporous hollow fiber support membrane 4 by interfacial polymerization. Then, the microporous hollow fiber support membrane 4 is passed through the liquid-liquid interface S1 between the second solution 2 and the third liquid 3, and introduced into the third liquid 3. The microporous hollow fiber support membrane 4 is turned around the rollers 7' and 7 to go under the partition 6, and passed through the liquid-liquid interface S2 between the third liquid 3 and the aqueous solution of an acid acceptor 20, thereby causing neutralization in the aqueous solution of an acid acceptor 20. The membrane is taken out substantially vertically from the aqueous solution of an acid acceptor 20, followed by prompt feeding to the subsequent step such as drying. In this process, by the use of the third liquid 3, a series of steps for producing a composite hollow fiber membrane can be conducted with high ease and reliability.

Figure 4:
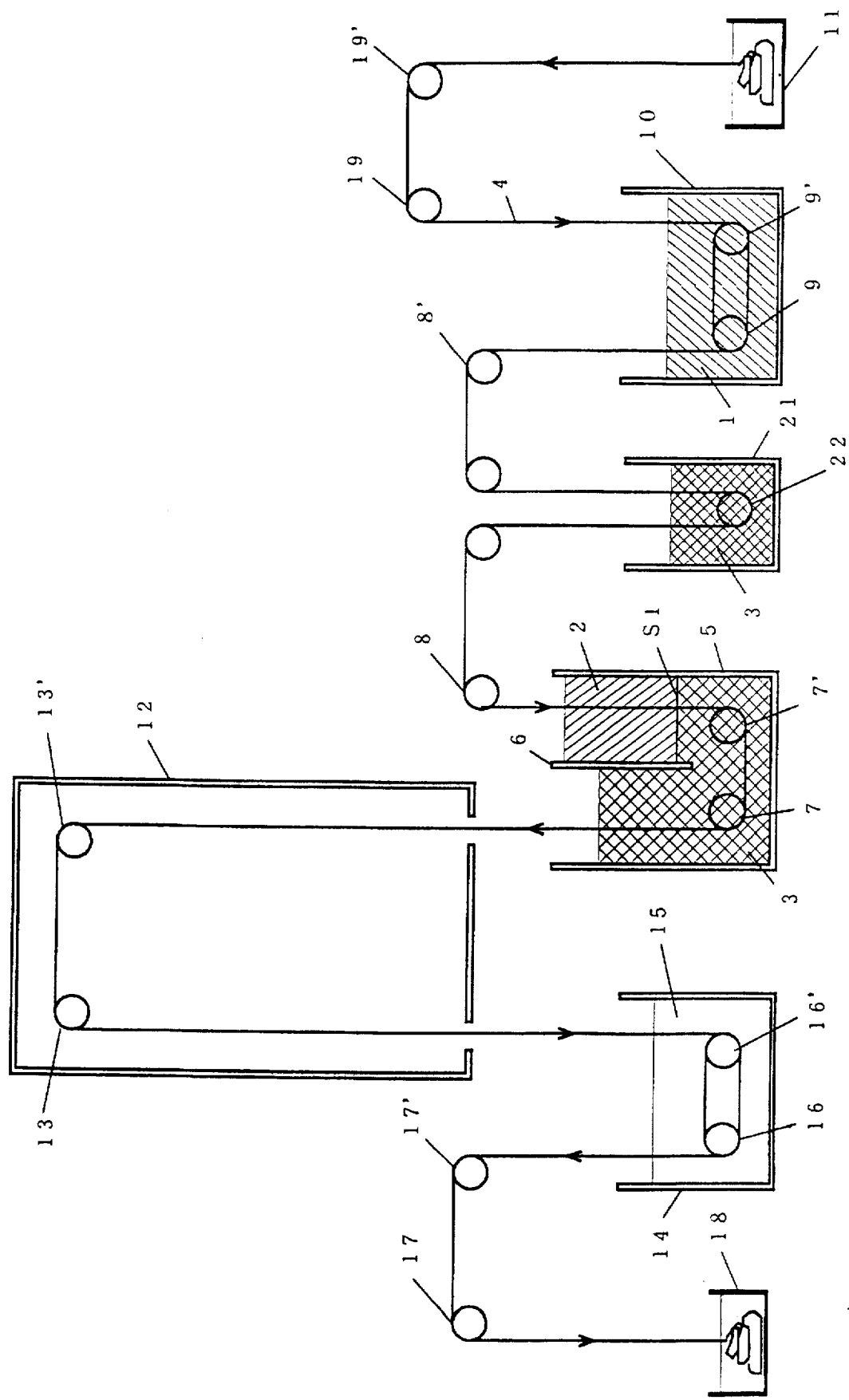
FIG. 4 is a schematic flow diagram similar to that of FIG. 2, except that an excess of the first solution on the outer surface of a microporous hollow fiber support membrane is removed by the use of a third liquid after immersion in the first solution.

FIG. 4 show an example of the case where an excess of the first solution on the outer surface of a microporous hollow fiber support membrane after immersion in the first solution is removed by the use of a third liquid. The outlines of this process are explained below.

In the same manner as shown in FIG. 2, the microporous hollow fiber support membrane 4 in wet state is taken out from the supply bath 11 by the driving rollers 19' and 19, which is then introduced and immersed into the first solution bath 10 to go through the first solution 1 by way of the driving rollers 9' and 9. Then, the microporous hollow fiber support membrane 4 having the first solution 1 adhering thereto and impregnated with the first solution 1 is taken out substantially vertically from the first solution bath 10 by the driving roller 8', and immersed in the third liquid bath 21 to go through the third liquid 3 by way of the driving roller 22. During the running in the third liquid 3, an excess of the first solution is removed. If the third liquid 3 is substantially immiscible with the first solution 1, the amount of the first solution 1 adhering to the outer surface of the microporous hollow fiber support membrane 4 can be controlled without changing the concentration of the first solution by adjusting the depth of this running in the third liquid 3. The excess of the first solution removed from the outer surface of the microporous hollow fiber support membrane 4 can readily be discharged from the upper part of the third liquid 3 in the third liquid bath 21. Then, the microporous hollow fiber support membrane 4 is introduced substantially vertically into the second solution bath 5 by the driving roller 8 to go through the second solution 2 out of touch with driving rollers or other feeding means, thereby causing interfacial polymerization on the outer surface of the microporous hollow fiber support membrane 4. After passing through the liquid-liquid interface S1 between the second solution 2 and the third liquid 3, the microporous hollow fiber support membrane 4 having a polymeric ultrathin layer that is being formed on the outer surface thereof by the interfacial polymerization is immersed into the third liquid 3, taken out substantially vertically from the third liquid 3 by way of the driving rollers 7' and 7, and introduced into the drying chamber 12 to fix the polymeric ultrathin layer on the outer surface of the microporous hollow fiber support membrane 4. The composite hollow fiber membrane is immersed into the water washing bath 14 by way of the driving rollers 13' and 13 to go though the washing water 15 by way of the driving rollers 16' and 16, and introduced into the receiving bath 18 by way of the driving rollers 17' and 17.

The following will describe the production process II of the present invention, mainly on an difference of this process from the production process I.

Figure 5:
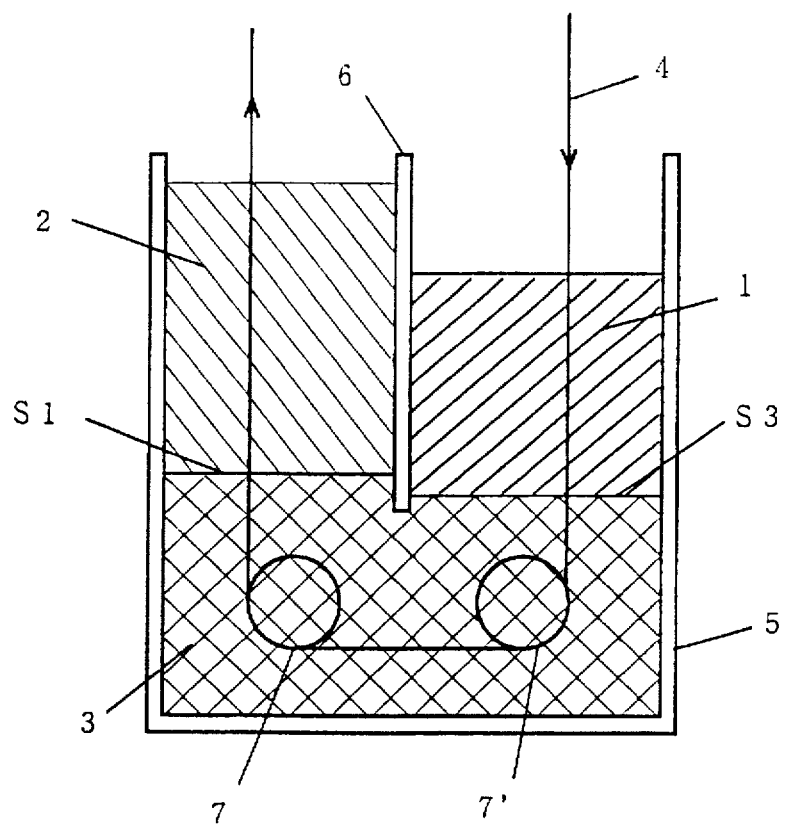
FIG. 5 is a schematic view showing a model of the method for successively contacting a microporous hollow fiber support membrane with a first solution, with a third liquid, and then with a second solution in the production process II of the present invention, wherein the specific gravity of the first solution is greater than that of the second solution but smaller than that of the third liquid and a liquid-liquid interface is formed between the first solution and the third liquid as well as between the third liquid and the second solution.

First, a model of the part is shown, in which a microporous hollow fiber support membrane is contacted with each solution or liquid in the production process II of the present invention. When the microporous hollow fiber support membrane is successively contacted with the second solution and then with the third liquid, the method for their contact may vary depending upon the magnitudes of specific gravity of this solution and liquid. FIG. 5 shows an example of the case where the specific gravity of the first solution is greater than that of the second solution but smaller than that of the third liquid. In this case, the third liquid 3 is put into the solution bath 5, and the first solution 1 and the second solution 2 are separately put into the respective upper parts divided by the partition 6 so as not to overflow the partition 6 and not to form a liquid-liquid interface therebetween. The microporous hollow fiber support membrane 4 is immersed and passed through the first solution 1, during which the microporous hollow fiber support membrane 4 has the first solution 1 adhering thereto and is impregnated with the first solution 1. Then, the microporous hollow fiber support membrane 4 is passed through the liquid-liquid interface S3 between the first solution 1 and the third liquid 3, at which time an excess of the first solution 1 adhering thereto is partially scraped off, and the microporous hollow fiber support membrane 4 is passed through the third liquid 3. Because the third liquid 3 is substantially immiscible both with the first solution 1 and the second solution 2, there occurs substantially no interfacial polymerization in the third liquid 3. Then, the microporous hollow fiber support membrane 4 is passed through the liquid-liquid interface S1 between the third liquid 3 and the second solution 2, and immersed and passed through the second solution 2, during which a polymeric ultrathin layer is formed on the outer surface of the microporous hollow fiber support membrane 4 by interfacial polymerization. At this time, a very small amount of the third liquid 3 is present on the outer surface of the microporous hollow fiber support membrane 4; therefore, a part of the third liquid 3 is incorporated into the membrane in the reaction of multifunctional compounds A and B. The microporous hollow fiber support membrane 4 is turned around the driving rollers 7' and 7 to go under the partition 6, and taken out substantially vertically from the second solution 2, followed by prompt feeding to the subsequent step such as drying. In this process, by the use of the third liquid 3, the microporous hollow fiber support membrane 4 can readily be passed though the second solution 2 substantially vertically to the respective liquid-liquid interfaces out of touch with driving rollers or other feeding means.

When the contact model shown in FIG. 5 is employed in the production process II, another bath containing the first solution may be provided before the contact of the microporous hollow fiber support membrane 4 with the first solution 1 in the solution bath 5 for the purpose of enhancing the adhesion of the first solution to the microporous hollow fiber support membrane and the impregnation of the microporous hollow fiber support membrane with the first solution.

Figure 6:
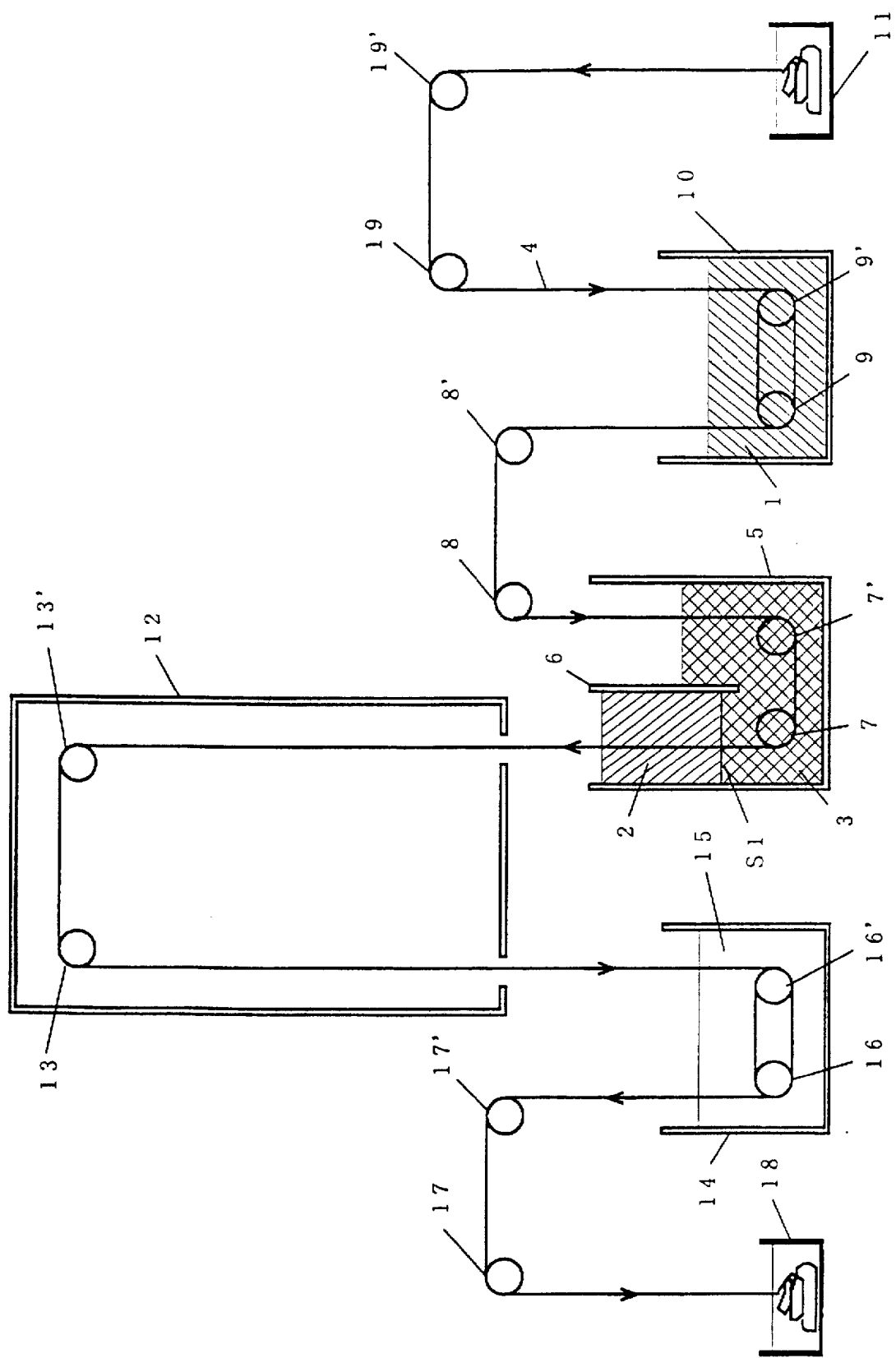
FIG. 6 is a schematic flow diagram showing the production of a composite hollow fiber membrane in the production process II using a model of the method for successively contacting a microporous hollow fiber support membrane with a third liquid and then with a second solution after immersion in the first solution, wherein the specific gravity of the third liquid is greater than that of the second solution and a liquid-liquid interface is formed only between the third and second solutions.

FIG. 6 shows an example of the case where the adhesion of a first solution to a microporous hollow fiber support membrane or the impregnation of a microporous hollow fiber support membrane with a first solution is enhanced and the removal of an excess of the first solution is enhanced by running the microporous hollow fiber support membrane in air. The outlines of this process are explained below.

From the supply bath 11, the microporous hollow fiber support membrane 4 in wet state is taken out by the driving rollers 19' and 19, which is then introduced and immersed in the first solution bath 10 to go through the first solution 1 by way of the driving rollers 9' and 9. Then, the microporous hollow fiber support membrane 4 having the first solution 1 adhering thereto and impregnated with the first solution 1 is taken out substantially vertically from the first solution bath 10 and run in air by the driving rollers 8 and 8'. During the running in air, an excess of the first solution is removed. Then, the microporous hollow fiber support membrane 4 is introduced substantially vertically into the second solution bath 5 to go through the third liquid 3 by way of the driving rollers 7' and 7, and after passing through the liquid-liquid interface S1 between the third liquid 3 and the second solution 2, the microporous hollow fiber support membrane 4 is introduced substantially vertically into the second solution 2, thereby causing interfacial polymerization on the outer surface of the microporous hollow fiber support membrane 4. The microporous hollow fiber support membrane 4 having a polymeric ultrathin layer formed on the outer surface thereof is taken out substantially vertically from the second solution 2 out of touch with driving rollers or other feeding means, and introduced into the drying chamber 12 to fix the polymeric ultrathin layer on the outer surface of the microporous hollow fiber support membrane 4. The subsequent steps are the same as those shown in FIG. 2 for the production process I. The amount of the first solution 1 adhering to the microporous hollow fiber support membrane 4 can be controlled by adjusting the distance of this running in air.

Figure 7:
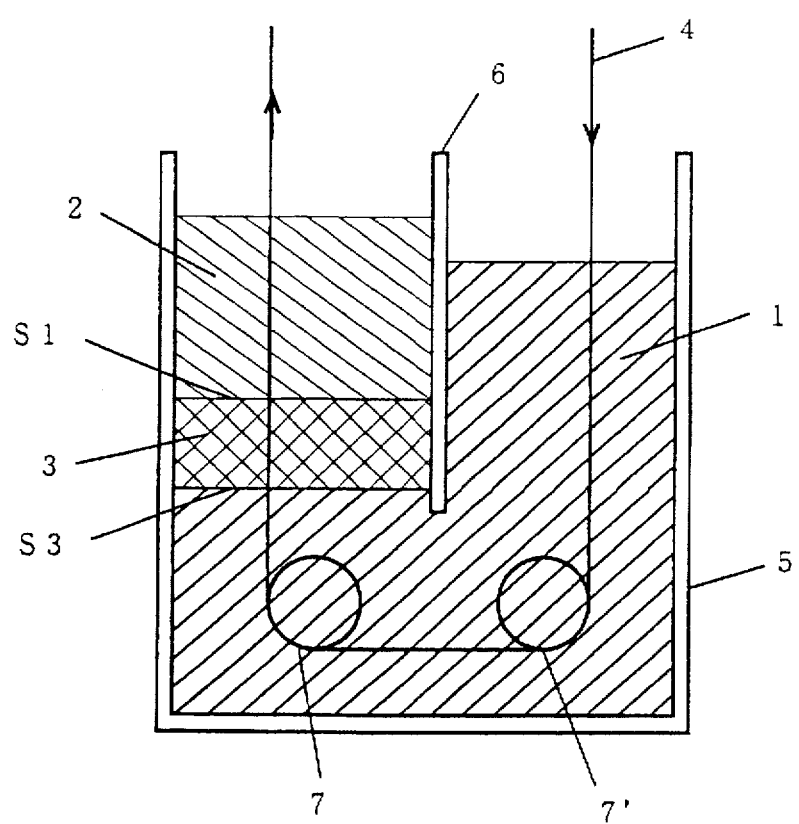
FIG. 7 is a schematic view showing another contact model similar to that of FIG. 5, except that the specific gravity of the third solution is grater than that of the second solution but smaller than that of the first solution.

FIG. 7 shows a model of the part, in which a microporous hollow fiber support membrane is contacted with each solution or liquid under the conditions that the specific gravity of the third liquid is greater than that of the second solution but smaller than that of the first solution. The microporous hollow fiber support membrane 4 is immersed in the first solution 1, and turned around the driving rollers 7' and 7 to go under the partition 6. Then, the microporous hollow fiber support membrane 4 is passed through the liquid-liquid interface S3 between the first solution 1 and the third liquid 3, and immersed in the third liquid 3. The microporous hollow fiber support membrane 4 is passed through the liquid-liquid interface S1 between the third liquid 3 and the second solution 2, and immersed in the second solution 2, during which a polymeric ultrathin layer is formed on the outer surface of the microporous hollow fiber support membrane 4 by interfacial polymerization. At this time, a very small amount of the third liquid 3 is present on the outer surface of the microporous hollow fiber support membrane 4; therefore, a part of the third liquid 3 is incorporated into the membrane in the reaction of multifunctional compounds A and B. The composite hollow fiber membrane thus obtained can be fed to the subsequent step such as drying treatment out of touch with driving rollers or other feeding means. In the case shown in this figure, the microporous hollow fiber support membrane can be passed though the third liquid out of touch with driving rollers or other feeding means, which makes it possible to cause interfacial polymerization in the second solution without disturbing the state of the first solution adhering to the outer surface of the microporous hollow fiber support membrane by driving rollers or other feeding means.

The present invention will be further illustrated by the following Examples, which are not to be construed to limit the scope thereof.

EXAMPLE 1

A spinning stock solution containing 29% by weight polysulfone (Amoco, Udel P-3500), 14.5% by weight polyethylene glycol (average molecular weight, 600), 0.5% by weight sodium laurylbenzenesulfonate, and 56% by weight dimethylacetamide (DMAc) was stirred at 100° C. for 12 hours. After it was confirmed that the spinning stock solution became homogenous, the stock solution was subjected to degassing under a reduced pressure of 50 cmHg at 100° C. for 1 hour, and then cooled to 50° C. From a nozzle with a double-tube structure used for the production of hollow fibers, having a spinning stock solution extrusion outlet of 0.66 mm in outer diameter and 0.5 mm in inner diameter, and a core gas extrusion outlet of 0.2 mm in diameter, the spinning solution and the core gas (nitrogen gas) were emitted at a rate of 0.75 $cm^3$/min and 0.30 $cm^3$/min, respectively, and dry-wet spinning was conducted at a spinning rate of 15 m/min to form a continuous microporous hollow fiber support membrane. The length of an air gap was 0.5 cm, and 5 wt% aqueous solution of DMAc at 25° C. was used as a solidifying solution. After solidification, the microporous hollow fiber support membrane was washed with water and then treated with hot water at 90° C. for 1 hour, which was stored by immersion in pure water until use for preparing composite hollow fiber membranes. The microporous hollow fiber support membrane had an outer diameter of 0.3 mm and an inner diameter of 0.2 mm. The cross-sectional structure of the microporous hollow fiber support membrane was such that a dense layer was formed both on the inner and outer surfaces and a uniform network was found all over the other part.

Twenty hollow fibers obtained above were bundled and made into a loop, one end of which was put in a holder and fixed with an epoxy resin. A mini-module having an effective length of 35 cm (membrane area on the basis of the outer diameter, 132 $cm^2$) in the microporous hollow fiber bundle was prepared by opening these hollow fibers. The pure water permeability per unit membrane area and unit pressure of this microporous hollow fiber support membrane was 1.0 m³/(m².day.(kg/cm²), and the dextran (average molecular weight, 185,000) rejection was 95%. The performance of the microporous hollow fiber support membrane was evaluated as follows.

The above microporous hollow fiber support membrane mini-module was used for permeation of RO water (Toyobo, HOLLOSEP) under an operating pressure of 5 kg/cm² at a temperature of 25° C. After 60 minutes, the amount of RO water passed through the mini-module was measured, and it was defined as the pure water permeability at an operating pressure of 5 kg/cm². The dextran rejection of the microporous hollow fiber support membrane was determined by supplying to the mini-module an aqueous solution of dextran (average molecular weight, 185,000) having a concentration of 300 g/m³ under an operating pressure of 5 kg/cm² at a temperature of 25° C., and measuring the concentration of dextran in the solution passed through the membrane. The dextran rejection was defined by the following equation.

Dextran rejection  =  [1 − (dextran concentration in the solution
passed through the membrane/dextran
concentration in the feed stock solution)] ×
100 (%)

The composite hollow fiber membrane was prepared according to the process shown in FIG. 2. The running rate of the microporous hollow fiber support membrane 4 was set at 7 m/min. The aqueous amine solution 1 was prepared by dissolving 2% by weight piperazine, 0.5% by weight triethylenediamine and 0.1% by weight sodium laurylsulfonate in pure water. The above microporous hollow fiber support membrane 4 immersed in pure water, was immersed and passed through this solution at a distance of 3 m. Then, the microporous hollow fiber support membrane 4 was run in air at a distance of 75 cm, and passed substantially vertically through the solution containing 1% by weight trimesoyl chloride (hereinafter referred to as TMC) dissolved in n-hexane, i.e., TMC/n-hexane solution 2, at a distance of 10 cm to cause an interfacial polymerization. The microporous hollow fiber support membrane 4 was passed through the liquid-liquid interface S1 between the TMC/n-hexane solution 2 and the fluorocarbon inert liquid (Sumitomo 3M, Fluorinert FC-70) as the third liquid, and then passed through the fluorocarbon inert liquid 3 at a distance of 20 cm. At this time, no polymeric film was formed at the liquid-liquid interface S1 between the fluorocarbon inert liquid 3 and the TMC/n-hexane solution 2, and it was supposed that the interfacial polymerization was effected only on the outer surface of the microporous hollow fiber support membrane 4. These steps were conducted at room temperature (about 25° C.).

The microporous hollow fiber support membrane 4 having a polymeric ultrathin layer formed thereon was passed through the drying chamber 12 at 50° C. at a distance of 1.5 m, which was then immersed and passed through the washing water 15 (pure water at 25° C.) of the washing bath 14, resulting in a composite hollow fiber membrane.

Twenty composite hollow fibers in wet state obtained above were bundled and made into a loop, one end of which was put into a holder and fixed with an epoxy resin. A mini-module having an effective length of 35 cm (membrane area 132 cm²) in the composite hollow fiber bundle was obtained by opening the composite hollow fibers. The performance of this composite hollow fiber membrane is shown in Table 1. In Example 7 of JP-B 38522/1990, it is shown that the salt (NaCl) rejection was 50% as the performance of a composite flat membrane obtained by interfacial polymerization of piperazine and trimesoyl chloride. The evaluation was conducted under a pressure of 13.6 atm, which is different from that employed herein, and the salt (NaCl) rejection attained by the composite hollow fiber membrane in Example 1 of the present invention is higher than that attained by the composite flat membrane of the above reference. It is, therefore, considered that a composite hollow fiber membrane having a polymeric ultrathin layer uniformly formed by interfacial polymerization on the outer surface of a microporous hollow fiber support membrane can be obtained by the present invention.

The performance of the composite hollow fiber membrane was determined as follows. An aqueous solution of NaCl at a concentration of 500 g/m³ was supplied to the outside of the composite hollow fiber membranes in the above minimodule under an operating pressure of 5 kg/cm² for desalination. After 60 minutes, measurements were started for water permeability per unit membrane area, and salt concentration of water passed through the membrane. In this case, the recovery, i.e., the ratio of passed water amount to supplied water amount, was 5% or less, which was sufficiently small. The measurements for $CaCl_2$ rejection were similarly conducted. The salt rejection was defined by the following equation:

Salt rejection=[1−(salt concentration of membrane-passed solution/
salt concentration of feed stock solution)]×100(%)

The composite hollow fiber membrane obtained above was dried in a vacuum at room temperature for three successive days and nights, and used as a sample for the determination of its fluorine content. To 0.1 g of this sample was added 0.3 ml of ethylene glycol as a combustion aid. The mixture was burned in a high-pressure oxygen bomb containing 20 ml of an absorbing alkali solution, and the content of fluorine (F) ions in the solution was determined by ion chromatography. As a result, 215 ppm F per weight of the dry composite hollow fiber membrane was detected, and it was confirmed that an organic fluorine compound (Fluorinert FC-70) was contained in the composite hollow fiber membrane.

EXAMPLE 2

A composite hollow fiber membrane was prepared and evaluated for performance in the same manner as described in Example 1, except that the production was conducted according to the process shown in FIG. 3 and 1 wt % aqueous sodium carbonate solution was used as an aqueous solution of an acid acceptor to be used after passing through the third liquid. The performance is shown in Table 1. An analysis by ion chromatography revealed that 200 ppm F was detected in the composite hollow fiber membrane.

EXAMPLE 3

A composite hollow fiber membrane was prepared and evaluated for performance in the same manner as described in Example 1, except that the production was conduced according to the process shown in FIG. 4 and an excess of the aqueous amine solution on the outer surface of the microporous hollow fiber support membrane after immersion in the aqueous amine solution was removed by the use of the third liquid. A fluorocarbon inert liquid (Sumitomo 3M, Fluorinert FC-70) was used as the third liquid, and the running distance in the third liquid was 20 cm. The performance is shown in Table 1. An analysis by ion chromatography revealed that 331 ppm F was detected in the composite hollow fiber membrane.

EXAMPLE 4

A composite hollow fiber membrane was prepared and evaluated for performance in the same manner as described in Example 1, except that an excess of the aqueous amine solution on the outer surface of the microporous hollow fiber support membrane after immersion in the aqueous amine solution was removed in a drying chamber. The composite hollow fiber membrane was dried by running at a distance of 2 m in the drying chamber at 40° C. The performance was shown in Table 1. An analysis by ion chromatography revealed that 170 ppm F was detected in the composite hollow fiber membrane.

EXAMPLE 5

A continuous microporous hollow fiber support membrane was obtained by the same production process as described in Example 1, except that the spinning stock solution contained 29% by weight polysulfone, 23.2% by weight polyethylene glycol and 47.3% by weight DMAc, the flow rate of the spinning stock solution, flow rate of the core gas, spinning rate, length of air gap and DMAc concentration of a solidifying solution were 0.54 cm$^3$/min, 0.86 cm$^3$/min, 30 m/min, and 1 cm and 30 wt %. The microporous hollow fiber support membrane was evaluated in the same manner as described in Example 1, and it was found that the pure water permeability was 0.77 m$^3$/(m$^2$.day. (kg/cm$^2$)) and the dextran rejection was 88.8%.

The preparation of a composite hollow fiber membrane was conducted according to the process shown in FIG. 6. The running rate of microporous hollow fiber support membrane 4 was 1 m/min. The microporous hollow fiber support membrane 4 was immersed in the aqueous amine solution 1 in the same manner as described in Example 1. Then, the microporous hollow fiber support membrane 4 was run in air at a distance of 40 cm, and successively passed through the fluorocarbon inert liquid 3 (Sumitomo 3M, Fluorinert FC-70) at a distance of 20 cm, through the liquid-liquid interface S1 between the fluorocarbon inert liquid 3 and the TMC/n-hexane solution 2 containing 1% by weight TMC dissolved in n-hexane, and through the TMC/n-hexane solution 2 at a distance of 10 cm to cause an interfacial reaction. At this time, no polymeric film was formed at the liquid-liquid interface S1 between the fluorocarbon inert liquid 3 and the TMC/n-hexane solution 2, and it was clear that the interfacial polymerization was effected only on the outer surface of the microporous hollow fiber support membrane 4. These steps were conducted at room temperature (about 20° C.).

Then, the composite hollow fiber membrane 4 was passed through the drying chamber 12 at 50° C. at a distance of 3 m, which was then treated and evaluated in the same manner as described in Example 1. The performance is shown in Table 1. An analysis by ion chromatography revealed that 375 ppm F was detected in the composite hollow fiber membrane.

COMPARATIVE EXAMPLE 1

Figure 8:
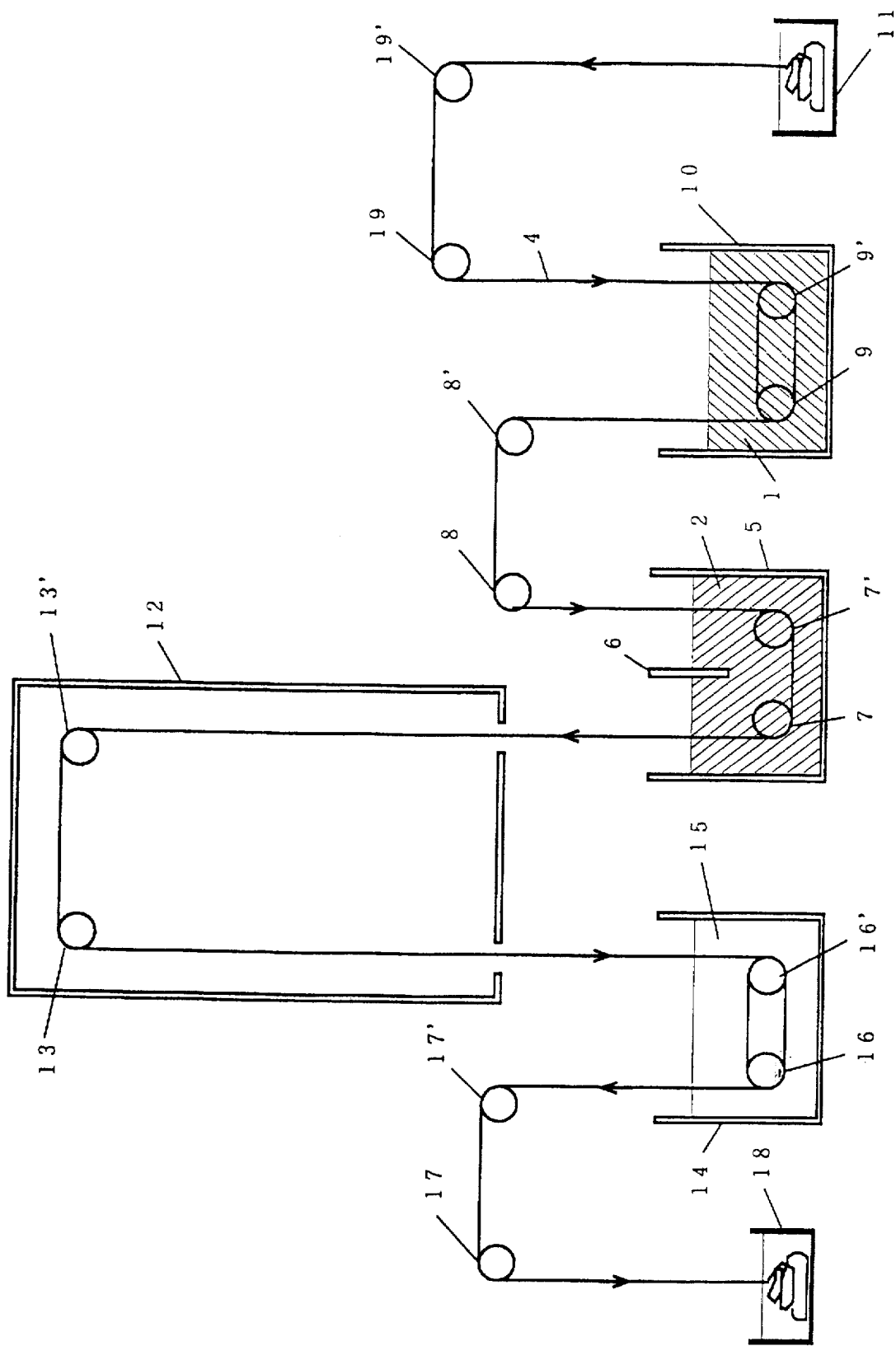
FIG. 8 is a schematic flow diagram showing the conventional production of a composite hollow fiber membrane, wherein no liquid-liquid interface is formed between the first and second solutions.

A microporous hollow fiber support membrane was prepared in the same manner as described in Example 1, and a composite hollow fiber membrane was prepared according to the process shown in FIG. 8 with no third liquid. The preparation was different from that of Example 1 in the following points. The microporous hollow fiber support membrane 4 was immersed and passed through the aqueous amine solution 1 at a distance of 3 m. Then, the microporous hollow fiber support membrane 4 was run in air at a distance of 75 cm, and passed through the TMC/n-hexane solution 2 at a distance of 10 cm to cause interfacial polymerization. The composite hollow fiber membrane was passed through the drying chamber 12 at 50° C., which was then treated and evaluated in the same manner as described in Example 1. The performance is shown in Table 1. The selectivity performance, i.e., salt rejection, was lower than that of Example 1. An analysis by ion chromatography revealed that no fluorine was detected in the composite follow fiber membrane. In this process, a polymeric film was formed on the outer surface of the microporous hollow fiber support membrane 4 in the TMC/n-hexane solution 2, during which the outer surface of the microporous hollow fiber support membrane 4 got in touch with the driving rollers 7' and 7. For this reason, the polymeric ultrathin layer formed seemed to be damaged by peeling or other trouble, which led to the above deterioration of performance.

COMPARATIVE EXAMPLE 2

A microporous hollow fiber support membrane was prepared in the same manner as described in Example 5, and a composite hollow fiber membrane was prepared according to the process shown in FIG. 8 with no third liquid. The preparation was different from that of Example 5 in the following points. The microporous hollow fiber support membrane 4 was immersed and passed though the aqueous amine solution 1 at a distance of 3 m. Then, the microporous hollow fiber support membrane 4 was run in air at a distance 40 cm, and passed through the TMC/n-hexane solution 2 at a distance of 10 cm to cause interfacial polymerization. The composite hollow fiber membrane was passed through the drying chamber 12 at 50° C., which was then treated and evaluated in the same manner as described in Example 5. The performance is shown in Table 1. The selectivity performance, i.e., salt rejection, was lower than that of Example 5. An analysis by ion chromatography revealed that no fluorine was detected in the composite hollow fiber membrane. In this process, a polymeric ultrathin layer was formed on the outer surface of the microporous hollow fiber support membrane 4 in the TMC/n-hexane solution 2, during which the outer surface of the microporous hollow fiber support membrane 4 got in touch with the driving rollers 7' and 7. For this reason, the polymeric ultrathin layer formed seemed to be damaged by peeling or other trouble, which led to the above deterioration of performance.

COMPARATIVE EXAMPLE 3

A microporous hollow fiber support membrane was prepared in the same manner as described in Example 5, and a composite hollow fiber membrane was prepared according to the process shown in FIG. 9 with no third liquid. The preparation is different from that of Example 5 in the following points. The microporous hollow fiber support membrane 4 was immersed and passed through the aqueous amine solution 1 at a distance of 3 m, and run in air at a distance of 40 cm. The microporous hollow fiber support membrane 4 was immersed and passed again through the aqueous amine solution 1 at a distance of 20 cm, and through the liquid-liquid interface S4 between the aqueous amine solution 1 and the TMC/n-hexane solution 2. At the liquid-liquid interface S4, a polymeric ultrathin layer was formed by interfacial polymerization. Then, the microporous hollow fiber support membrane 4 was passed through the TMC/nhexane solution 2 at a distance of 10 cm. The composite hollow fiber membrane was passed though the drying chamber 12 at 50° C., which was then treated and evaluated for performance in the same manner as described in Example 5. The performance is shown in Table 1. The selectivity performance, i.e., salt rejection, was lower than that of Example 5. An analysis by ion chromatography revealed that no fluorine was detected in the composite hollow fiber membrane. In this process, no third liquid was used; therefore, the polymeric ultrathin layer was formed by interfacial polymerization at the liquid-liquid interface S4 between the aqueous amine solution 1 and the TMC/n-hexane solution 2, and its thickness was gradually increased with the lapse of time, which inhibited the formation of a polymeric ultrathin layer on the outer surface of the microporous hollow fiber support membrane. Thus, it is supposed that the selectivity performance, i.e., salt rejection, was deteriorated.

TABLE 1

|  | Water permeability ($m^3/(m^2.day)$) | Salt rejection (%) | |
| --- | --- | --- | --- |
|  |  | NaCl | CaCl$_2$ |
| Example 1 | 0.58 | 61.0 | 84.8 |
| Example 2 | 0.60 | 62.0 | 86.4 |
| Example 3 | 0.57 | 65.7 | 92.4 |
| Example 4 | 0.55 | 61.2 | 90.3 |
| Example 5 | 0.66 | 66.7 | 91.6 |
| Comp. Example 1 | 1.48 | 19.2 | 49.0 |
| Comp. Example 2 | 1.62 | 25.8 | 48.4 |
| Comp. Example 3 | 1.25 | 22.0 | 45.2 |

As described above, the composite hollow fiber membrane of the present invention is obtained by continuous and stable formation of a polymeric ultrathin layer on the outer surface of a microporous hollow fiber support membrane by interfacial polymerization, and it has excellent permeability and selectivity performance. Therefore, the composite hollow fiber membrane of the present invention can be used as a reverse osmosis membrane for the conversion of salt water or sea water into flesh water by desalination or for the production of ultra-pure water used in the production of semiconductors, or as a nano filtration membrane for small-sized pure water producing apparatus, water cleaner, high performance water cleaner, recovery of variable matter, and treatment of waste water.

What is claimed is:

1. A composite hollow fiber membrane comprising a microporous hollow fiber support membrane and a crosslinked polymeric ultrathin layer formed on the outer surface of said microporous hollow fiber support membrane, which composite hollow fiber membrane contains an organic fluorine compound that is substantially insoluble in water and is selected from the group consisting of perfluorocarbon compounds and perfluoroalkyl-containing compounds, wherein the amount of the organic fluorine compound is 1 to 1000 ppm in terms of fluorine content per weight of said composite hollow fiber membrane.

2. The composite hollow fiber membrane according to claim 1, wherein said polymeric ultrathin layer is made of a polyamide.

3. The composite hollow fiber membrane according to claim 1, wherein said microporous hollow fiber support membrane is made of a polysulfone.

4. The composite hollow fiber membrane according to claim 1, wherein said microporous hollow fiber support membrane has a dextran (average molecular weight, 185,000) rejection of at least 50%.

5. The composite hollow fiber membrane according to claim 1, which has a water permeability of at least 0.5 $m^3/m^2$.day under an operating pressure of 5 kg/cm$^2$ at a temperature of 25° C. at pH 6 and has a sodium chloride rejection from 0.05 wt % aqueous sodium chloride solution of at least 50%.

6. A process for producing a composite hollow fiber membrane as set forth in claim 1, comprising the steps of:

(a) contacting a microporous hollow fiber support membrane with a first solution containing multifunctional compound A;

(b) contacting the microporous hollow fiber support membrane treated in step (a) with a second solution which is substantially immiscible with said first solution and which contains multifunctional compound B, thereby causing interfacial polymerization between said multifunctional compounds A and B to form a polymeric ultrathin layer on the outer surface of said microporous hollow fiber support membrane; and (c) contacting the microporous hollow fiber support membrane treated in step (b) with a third liquid which is substantially immiscible with said second solution and which contains an organic fluorine compound that is substantially insoluble in water and is selected from the group consisting of perfluorocarbon compounds and perfluoroalkyl-containing compounds.

7. The process according to claim 6, wherein said multifunctional compound A has at least two reactive amino groups and said multifunctional compound B is an acid halide having at least bifunctionality.

8. The process according to claim 6, wherein there is a liquid-liquid interface formed between said second solution and said third liquid.

9. The process according to claim 6, wherein said third liquid is substantially immiscible both with said first solution and said second solution.

10. The process according to claim 6, further comprising removing an excess of the first solution on the outer surface of said microporous hollow fiber support membrane after contact with said first solution.

11. The process according to claim 6, wherein the organic fluorine compound comprises a perfluoralkyl-containing tertiary amine of the formula:

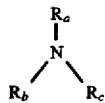

12. A process for producing a composite hollow fiber membrane as set forth in claim 1, comprising the steps of:

(a) contacting a microporous hollow fiber support membrane with a first solution containing multifunctional compound A;

(b) contacting the microporous hollow fiber support membrane treated in step (a) with a third liquid which is substantially immiscible with said first solution and which contains an organic fluorine compound that is substantially insoluble in water and is selected from the group consisting of perfluorocarbon compounds and perfluoroalkyl-containing compounds; and (c) contacting the microporous hollow fiber support membrane treated in step (b) with a second solution which is substantially immiscible both with said first solution and said third liquid and which contains multifunctional compound B, thereby causing interfacial polymerization between said multifunctional compounds A and B to form a polymeric ultrathin layer on the outer surface of said microporous hollow fiber support membrane.

13. The process according to claim 12, wherein said multifunctional compound A has at least two reactive amino groups and said multifunctional compound B is an acid halide having at least bifunctionality.

14. The process according to claim 12, wherein there is a liquid-liquid interface formed between said second solution and said third liquid.

15. The process according to claim 12, wherein there is a liquid-liquid interface formed between said first solution and said third liquid.

16. The process according to claim 12, further comprising removing an excess of the first solution on the outer surface of said microporous hollow fiber support membrane after contact with said first solution.

17. The process according to claim 12, wherein the organic fluorine compound comprises a perfluoralkyl-containing tertiary amine of the formula:

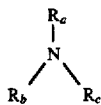

wherein $R_a$, $R_b$, and $R_c$ are independently $C_4$–$C_6$ perfluoroalkyl and the total number of carbon atoms is 14 to 16.

18. The composite hollow fiber membrane as set forth in claim 1, wherein the organic fluorine compound comprises a perfluoralkyl-containing tertiary amine of the formula:

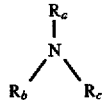

wherein $R_a$, $R_b$, and $R_c$ are independently $C_4$–$C_6$ perfluoroalkyl and the total number of carbon atoms is 14 to 16.

19. The composite hollow fiber membrane as set forth in claim 1, wherein the organic fluorine compound comprises a perfluoroalkyl-containing tertiary amine of the formula $C_nF_{2n+3}N$, wherein n is 15.

* * * * *